United States Patent [19]
Kirn et al.

[11] Patent Number: 5,710,703
[45] Date of Patent: Jan. 20, 1998

[54] METHOD AND SYSTEM FOR SHARING A HARDWARE RESOURCE

[75] Inventors: Larry Joseph Kirn, West Bloomfield; John Merritt, Farmington Hills; Gary K. Lowe, Troy, all of Mich.

[73] Assignee: Chrysler Corporation, Auburn Hills, Mich.

[21] Appl. No.: 476,617

[22] Filed: Jun. 7, 1995

[51] Int. Cl.$^6$ ............................................. F02D 29/00
[52] U.S. Cl. ..................... 364/424.034; 364/431.04; 364/431.051; 364/431.12
[58] Field of Search .................... 364/200, 424.01, 364/424.02, 424.03, 424.04, 424.05, 431.04, 431.051, 431.12; 395/275, 325, 575, 725, 800; 370/16, 85.4

[56] References Cited

U.S. PATENT DOCUMENTS

| | | | |
|---|---|---|---|
| 4,750,116 | 6/1988 | Pham et al. | 364/200 |
| 5,168,547 | 12/1992 | Miller et al. | 395/325 |
| 5,168,570 | 12/1992 | Eckert et al. | 395/725 |
| 5,208,914 | 5/1993 | Wilson et al. | 395/275 |
| 5,239,629 | 8/1993 | Miller et al. | 395/325 |
| 5,386,551 | 1/1995 | Chikira et al. | 395/575 |
| 5,491,694 | 2/1996 | Oliver et al. | 370/85.4 |
| 5,524,255 | 6/1996 | Beard et al. | 395/800 |
| 5,537,542 | 7/1996 | Glowny et al. | 395/800 |
| 5,570,345 | 10/1996 | Kaprielian et al. | 370/16 |

Primary Examiner—Kevin J. Teska
Assistant Examiner—Russell W. Frejd
Attorney, Agent, or Firm—Roland A. Fuller, III

[57] ABSTRACT

A method and system for sharing a hardware resource in a multistate system is provided. The method includes the steps of monitoring changes in state in the multistate system using a pickup device, accessing a memory containing control parameters required by the hardware resource in response to a state signal from the pickup device, applying a control signal that is related to the accessed control parameters to the hardware resource, and connecting the hardware resource to a selected one of several output devices. The system for sharing a hardware resource includes a memory for storing control parameters, a microprocessor in communication with the memory for updating the control parameters, a pickup device for generating a state signal corresponding to the state of the system, a selection device, for example, a multiplexer, that is responsive to the state signal for selecting one of the control parameters from the memory, a device for applying a control signal related to the selected control parameter to the shared hardware resource, and a switch in communication with the shared hardware resource and selectively in communication with one of a plurality of input or output drivers. The input/output devices for both the method and the system are selected in relation to the state signal, and may be selected based on the present state (Nth state) of the system or a previous state, for example, the Nth-1 state.

33 Claims, 4 Drawing Sheets

METHOD AND SYSTEM FOR SHARING A HARDWARE RESOURCE

FIELD OF THE INVENTION

The present invention relates to the multiplexing of hardware resources and, more particularly, to a fault tolerant control system for dynamically directing signals to and from shared hardware resources without microprocessor intervention.

BACKGROUND OF THE INVENTION

Automated computer-based systems typically use one or more ancillary hardware devices to communicate with and control physical devices that are part of the system. The ancillary hardware may include, for example, analog-to-digital or digital-to-analog convertors, an event-time capture unit, or perhaps a comparator (e.g., a time comparator). Such ancillary hardware is sometimes preferred for its increased speed as compared to conventional software routines. However, cost and physical constraints may impose limits on the extent of hardware that can be utilized in a particular implementation.

One exemplary automated system is the cyclic operation of an internal combustion engine. Conventionally, such a system has a multiplicity of identical components associated with certain portions of the engine, for example, the engine cylinders. In view of minor manufacturing deviations from cylinder to cylinder, each cylinder may have a dedicated hardware timer associated with it for controlling the period of operation of fuel injectors so as to commence and terminate the delivery of fuel to the cylinder. Some current production engines may share cylinder timers; however, the shared timers are set to a median interval for all the cylinders. The complexity of the engine system is increased when real world factors are considered, such as the number of engine cylinders (e.g., four, six, eight, or more), the timing of the fuel injectors relative to the engine angular positions, physical constraints of the engine compartment, and temperature.

In an effort to curb hardware costs, some automated systems have multiplexed hardware resources between several inputs and outputs so that the hardware resource may be "shared" with other devices in the physical system. The sharing of hardware resources has been limited to those applications that require only constant or static parameter passing, such as a basic trigger mechanism to cause the shared hardware resource to perform a preselected function once connected to a chosen device.

While software techniques are known for multiplexing signals, and can therefore dynamically direct signals to a shared hardware resource, there is an undesirable decrease in the execution speed of the system when a hardware resource is shared because of the need to perform additional processing steps to control the sharing, which decreases the speed of the physical system being controlled. For example, the microprocessor used to execute a particular software routine is typically used to execute other software programs for various system functions. If the microprocessor is not in a "ready" state to run a particular software routine, for example, because it is processing another routine, then the execution speed of the particular software will be compromised.

One approach to sharing both hardware and operating system resources is disclosed in U.S. Pat. No. 5,168,547 to Miller et al. The architecture of that system distributes management responsibility for input and output communications across a number of microprocessors. That system has one or more multiprocessor clusters, each of which includes an arbitration node configured to interconnect different processors with the resources to be shared. To assure that only one processor accesses a peripheral component at any one time, the operating system uses a semaphore-like allocation mechanism to lock a device while it is in use via a "command block". In operation, the operating system instructs the peripheral component that there is work to be done, and the peripheral component fetches the "command block" so that it can perform the requested operation. Only after the peripheral device has completed its task, will that "command block" be released so that other processors may share the same device. Unfortunately, this distributed architecture still requires the addition and duplicity of several of the hardware components, and has the hardware in a waiting state until the semaphore-like allocation mechanism allows the system to change states.

What is needed, and has herefore not been available, is a fault tolerant control system for dynamically directing signals to and from shared hardware resources without software intervention.

SUMMARY OF THE INVENTION

It is an object of the invention to provide a means for sharing resources that require dynamic control parameters.

It is another object of the invention to reduce software execution overhead in control systems.

It is yet another object to harness is the engine of an automotive system as the instigator of the control system.

It is an additional object to provide a control system that operates in a fault tolerant manner.

It is a further object to provide a control automotive control system that achieves the foregoing objects and satisfies the foregoing needs.

In an exemplary embodiment of the present invention, an apparatus for multiplexing resources in an electromechanical system is provided in which a state monitor controls both the input and the output of a shared resource by generating state signals. Using the state signal, the state monitor selects the memory address of input values to be directly accessed by the shared resource, the input values being independently accessed and updated by a microprocessor which may be part of an automotive LAN (local area network). Using the data at that memory address, the shared resource generates and provides an output signal to an output driver which is also selected by the state signal.

The electromechanical system may be the fuel injection system for an internal combustion engine used in an automotive vehicle. The system would include a cylinder counter that receives clock pulses and reset pulses from a crankshaft pickup device. The cylinder counter output would be the state signals which, e.g., represent one of the four possible cylinder states. The state signal connects a start signal generator, i.e., a shared resource, to a memory location where it gets the data it needs in order to know when to start a fuel injector. Also, an elapsed timer (another shared resource) is connected to the memory to get data on how long the fuel injectors should stay on after a start signal. This data is different for each of the cylinders and the state signals cause the shared resources to get data from different parts of memory, depending on the state of the system.

BRIEF DESCRIPTION OF THE DRAWINGS

These and other features of the present invention will be more readily apparent from the following detailed description of an exemplary application, taken in conjunction with the attached drawings, wherein.

DETAILED DESCRIPTION OF AN EXEMPLARY APPLICATION

Figure 1:
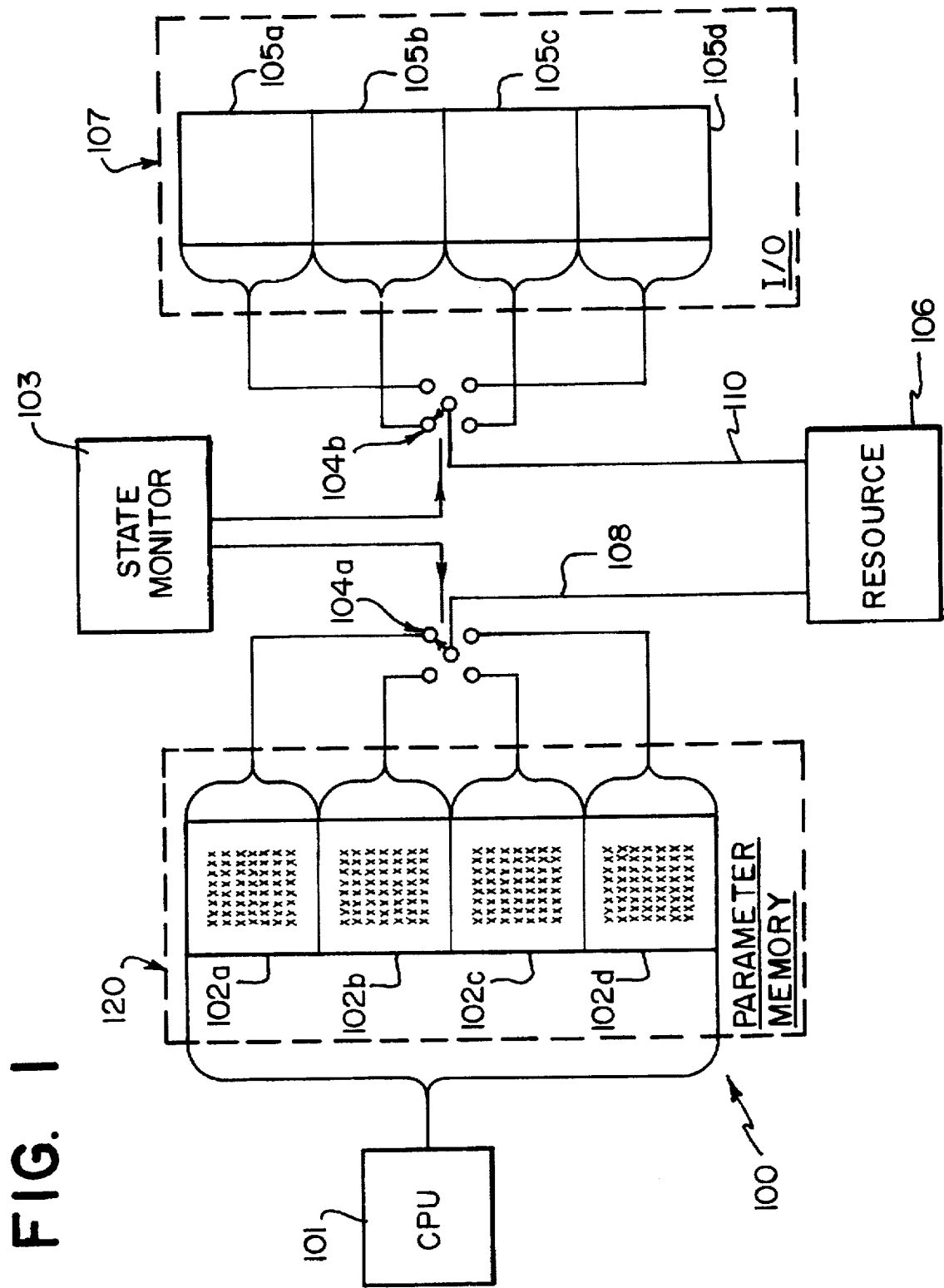
FIG. 1 is a block diagram illustrating the principle of the present invention.

By way of overview and introduction, there is seen in FIG. 1 a block diagram of a control system 100 according to the invention. In the control system 100, a resource 106 has its input 108 and its output 110 dynamically connected between a memory device 120 and an input/output port 105 through switching networks 104a, 104b, respectively. These dynamic connections, which may be electrical or mechanical, are made (and severed) in response to a state monitor 103 which changes these connections 104a, 104b in synchronization with changes in the state of the control system 100 and free of a central processing unit 101 (which also may be as indicated with the memory device 120). In particular, the state monitor 103 connects the input 108 of the resource 106 to one of memory locations 102a, 102b, 102c, or 102d through switching device 104a, and connects the output 110 to one of the input/output ports 105A, 105B, 105C, 105D, which may be part of an input/output chip 107, which may in turn be connected (in some implementations) to another memory device (not shown). In response to a change in the state of the control system 100, the state monitor 103 independently causes each of the switching devices to connect the input 108 and output 110 of the resource 106 to another of the parameter memory locations 102 and input/output ports 105. In the meantime, CPU 101 is unencumbered by the sharing of the resource 106 and may update, access, or otherwise share the parameter memory 102, including memory locations 102a–d.

Figure 2A:
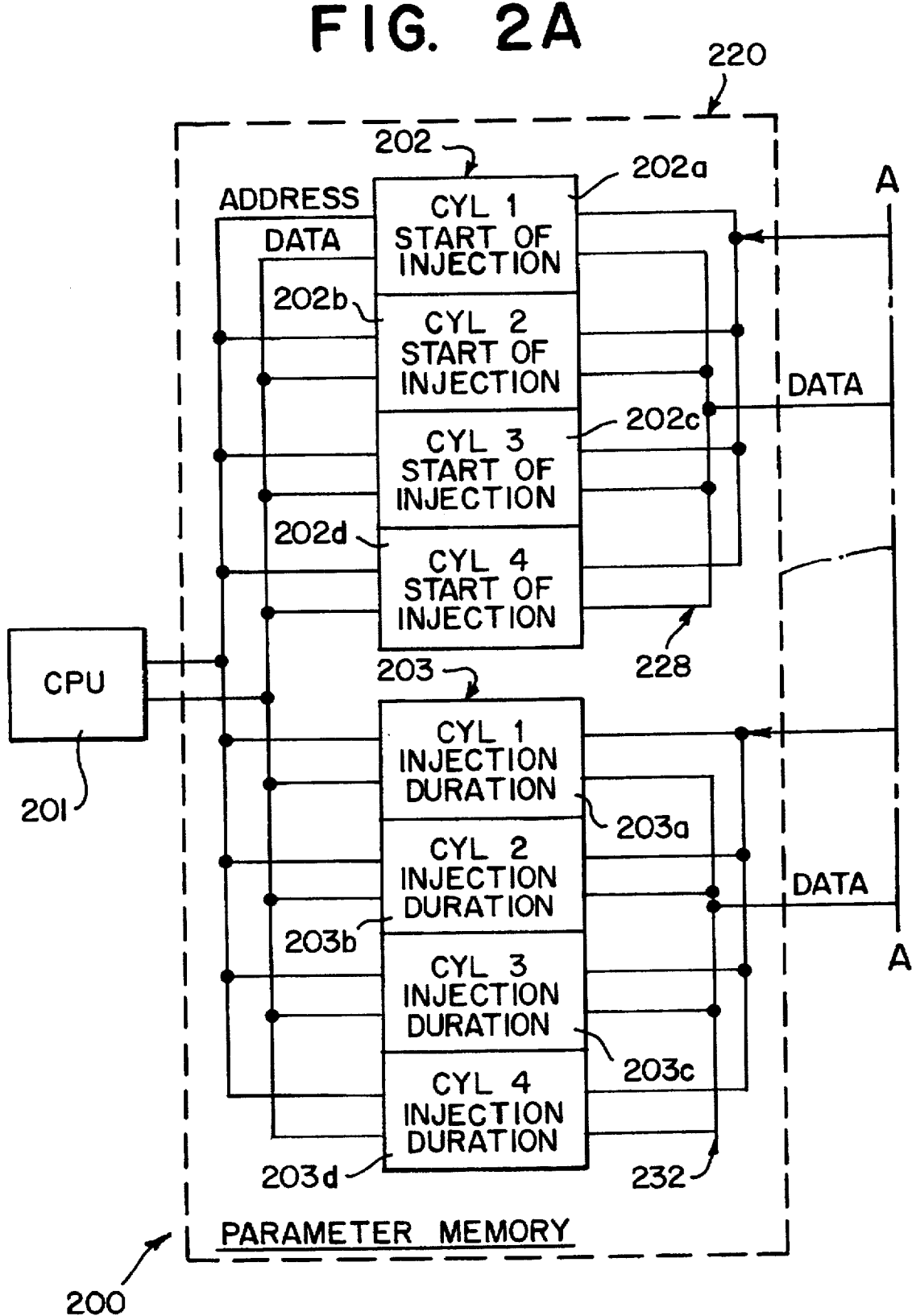
FIG. 2A is a first portion of a block diagram of a preferred embodiment of the present invention.
Figure 2B:
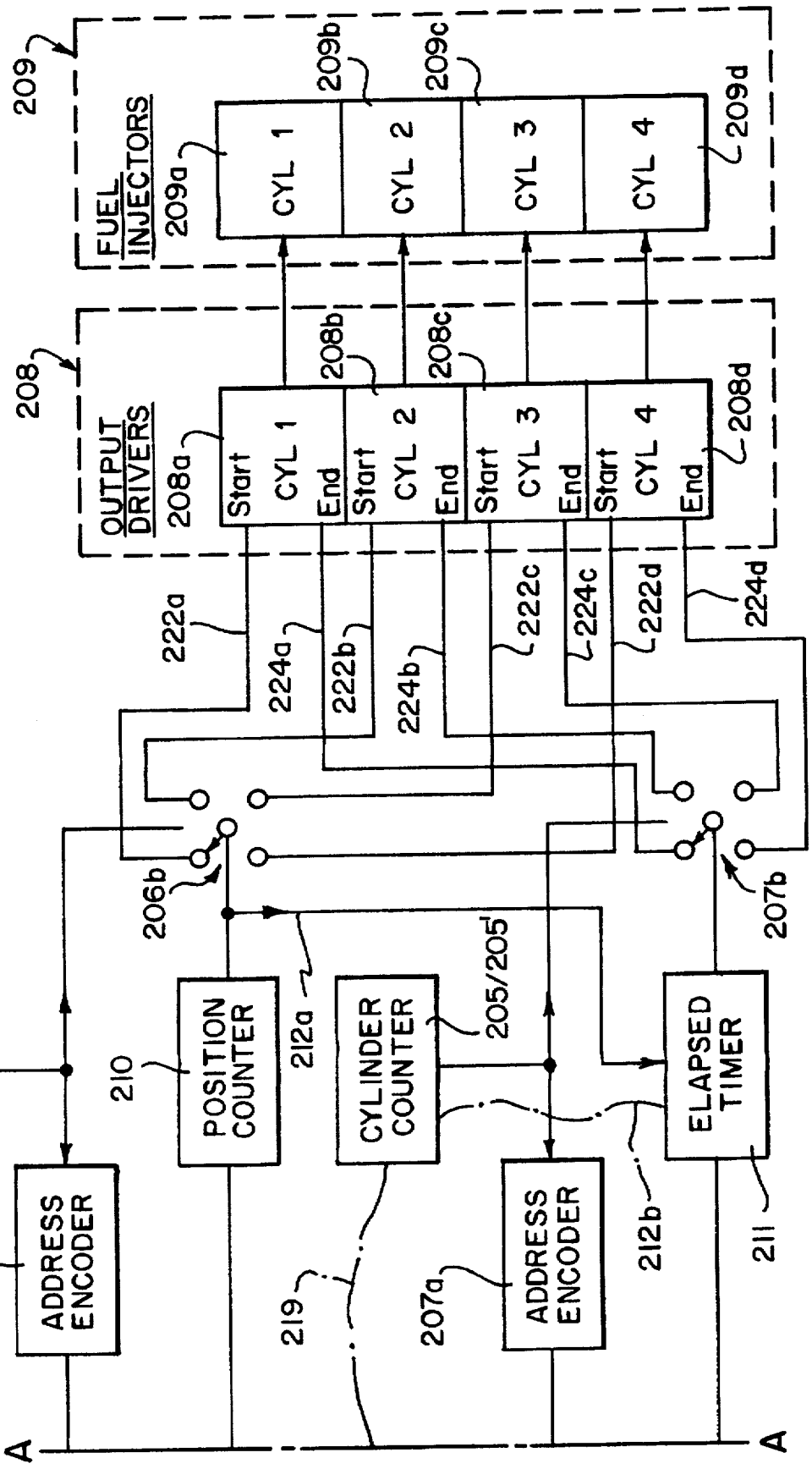
FIG. 2B is a second portion of the block diagram of FIG. 2A, FIGS. 2A and 2B being connected along match line A—A.

FIGS. 2A and 2B comprise a block diagram of an exemplary application of the present invention for sharing hardware resources used to control fuel injectors in a four cylinder, four stroke, internal combustion engine, shown diagrammatically as system 200. As described in detail below, fuel injectors 209a, 209b, 209c, and 209d, which are associated with each of the four engine cylinders, share two hardware resources in this exemplary application, namely, a position counter 210 and an elapsed timer 211. The and designations after the fuel injector element number 209 identify the individual cylinders (not shown) in the engine system 200; however, these and other elements, signals, and operating parameters are referred to more generally in this specification without the alphabetic designations unless reference is being made to a specific cylinder.

The fuel injection system of FIGS. 2A and 2B include a microprocessor 201 having memory 220 associated therewith for storing data related to the operation of the fuel injection system as well as other data as may be required for further aspects of the engine's operation, for example, an automatic transmission system. The stored data includes position data which represent the cylinder position at which a cylinder is to receive an injection of fuel, and the injection duration data. The microprocessor 201 dynamically calculates for each cylinder (1) the position data, which is then stored at address locations 202 within the memory 220, and (2) the injection duration data, which is then stored at address locations 203 also within the memory 220. Preferably, the memory 220 is a dual port random access memory (RAM) device having address busses 227, 231 and corresponding data busses 228, 232.

The fuel injectors 209a, 209b, 209c, or 209d for each cylinder are driven by a respective output driver 208a, 208b, 208c, or 208d. The position counter 210 generates an enable or activation signal for causing a preselected output driver 208 to drive a corresponding fuel injector 209 of a selected cylinder, whereas the elapsed timer 211 generates a disable or cessation signal for terminating fuel injection to the selected cylinder. The output signals generated by the position counter 210 and elapsed timer 211 are connected to a respective one of output drivers 208 for a particular cylinder only when the piston within that cylinder is in an appropriate position to receive an injection of fuel, as described below. The inputs from the memory 220 to the position counter 210 and elapsed timer 211 are changed in synchronization with the signals from cylinder counters 204, 205, respectively, so that each cylinder has fuel injected into it at an appropriate moment and for an appropriate duration. The changes of inputs and outputs are instigated by the changes in the piston position (e.g., as determined by monitoring the rotation of the crankshaft) and do not require handshaking or other influence of the microprocessor 201.

In FIG. 2B, cylinder counters 204 and 205 produce signals representative of the current state of the engine. The counters 204, 205 may comprise binary down-counters having clock and reset inputs and may be the commercially available 74LS161 integrated circuit devices. Preferably, the position of the piston within a given cylinder corresponds to a state of the system (e.g., the position at the beginning of either the induction, compression, power, or exhaust stroke, also known as the engine angular position) so that counters 204, 205 independently increment 0, 1, 2, 3, 0, 1 . . . in synchronization, but not necessarily in phase, as the four-cylinder engine cycles through the engine states. Alternatively, the cylinder counters 204, 205 can be configured to decrement. (By a decoding process, described below, the state of the system is changhed with respect to each of the cylinders arriving at a selected one of the foregoing stroke positions.) The clock and reset signals for incrementing or decrementing cylinder counters 204, 205 are preferably derived from engine position data, as described below in connection with FIG. 3.

Cylinder counter 204 controls the external connections of the position counter 210 and, therefore, the commencement of fuel injection for the present state of the system 200 with respect to the determined engine position data. Based on present engine position data, a particular one of cylinders a–d will either have (1) no fuel being injected into it, (2) the start of fuel being injected into it, (3) the injection of fuel in progress, or (4) fuel injection being terminated. As the pistons cycle through their respective stroke positions, these conditions change, and provided that the fuel pulse duration is less than or equal to the duration of a single state of the system 200, only one position counter 210 and one elapsed timer 211 need be used. This results in a hardware savings in that these two elements are not needed for each of the four cylinders. Counter 210 is reset in synchronization with the changes in state of cylinder counter 204.

The state signal is applied to a data encoder 206a which encodes a signal used to address the memory device 220 to obtain position data for the present state (engine position) of the system 200. Preferably, the state signal from cylinder counter 204 forms the low order bits of the address of the desired position data location 202. The data encoder 206a applies an address corresponding to the present one of the position value addresses for memory locations 202a, 202b, 202c, or 202d, as indicated by the cylinder counter 204, on the address bus 227 of the memory device 220. The memory device 220 responds with a first data or control signal on data bus 228. The First data signal represents the position data stored for the present state of the system 200 and is provided as an input to the position counter 210 so that counter 210, after being reset by the state signal from cylinder counter 204, is set to the value of the first data signal. The cylinder counter 204 then counts down from that value to a terminal value, for example, zero, at which point it generates a start signal for both (1) the drivers connected to the appropriate fuel injector, and (2) the interval timer 211. Instead of counting down, the counter can be used in conjunction with a comparator device when configured to count up to a value equal to or derived from the first data signal.

The state signal from the cylinder counter 204 is also applied to a data selector 206b. The data selector 206b responds by electrically connecting the output of the position counter 210 to the output driver 208 that corresponds to the present state of the system 200. Preferably, the data selector 206b comprises a commercially available 74LS151 multiplexer. The data selector 206b could also be implemented as multipole mechanical switches driven by the engine shafts or electronic switches, although this is not preferred for applications that require frequent switching.

The start signal generated by the position counter 210 is provided via the data selector 206b to the output driver 208 that has been selected. The start signal is generated at the moment that the engine is in a position corresponding to the positional data retrieved from address location 202 over data bus 228. At the same moment, the position counter 210 generates an enable signal to enable the elapsed timer 211. The manner of determining the engine position, as well as the timing and reset signals is described below in connection with FIG. 3.

The data selector 206b routes the start signal to a start injection input port 222 of a selected one of the output drivers 208 in accordance with the state signal from cylinder counter 204, thereby triggering or causing the corresponding fuel injector 209 to commence injecting fuel into the selected cylinder.

The duration of fuel injection is controlled in response to state signals from cylinder counter 205. A state signal from the cylinder counter 205 is applied to a data encoder 207a which encodes a signal used to address the memory device 220 to obtain injection duration data for the present state (engine angular position) of the system 200. Preferably, the state signal from cylinder counter 205 forms the low order bits of the address in memory 220 of the injection duration data. The data encoder 207a applies an address corresponding to the present one of the injection duration addresses 203a, 203b, 203c, or 203d, as indicated by the cylinder counter 205, an the address bus 231 of the memory device 220. The memory device 220 responds with a second data signal on data bus 232. The second data signal represents the injection duration data stored for the present state of the system 200 and is provided to an input of the elapsed timer 211.

After receiving the second data signal, and in response to the enable signal from the position counter 210, the elapsed timer 211 counts down relative to the time specified in the second data signal, i.e., for the duration of fuel injection. When the elapsed timer 211 has counted the time down to zero, or some other arbitrary value, a disable or stop signal is applied to a data selector 207b which also receives the state signal from the cylinder counter 205. The data selector 207b operates similar to the data selector 206b in that it electrically connects the output of the elapsed timer 211 to the output driver 208 that corresponds to the present state of the system 200. This connection is made in response to the state signal from the cylinder counter 205. Selector 206b preferably comprises a commercially available 74LS151 multiplexer, but may also be implemented as described above for selector 206b.

Data selector 207b routes the disable or stop signal to a stop injection input port 224 of a selected one of the output drivers 208 in accordance with the state signal from cylinder counter 205, thereby triggering or causing the corresponding fuel injector 209 to cease injecting fuel into the selected cylinder.

While cylinder counters 204, 205 may be in phase when fuel pulse duration only spans a single state of the engine, that is, when fuel is provided to a cylinder and subsequently stopped prior to the engine system 200 changing states, there are circumstances in which cylinder counter 205 may lag behind cylinder counter 204 such that fuel injection into one cylinder in engine state N-1 may be turned off after the cylinder counter 204 has advanced the engine state to state N, but before fuel injection into another cylinder has commenced. This "quasi-overlap" condition exists when the position data 202 and injection data 203 require fuel injection to a particular cylinder in more than one engine state. If it is desirable to have the cylinder counter 205 configured to lag behind cylinder counter 204, it is preferable that element 205 be implemented as a subtractor element 205' which can subtract an arbitrary value from the output of cylinder counter 204. Thus, the subtractor element 205' can be made to lag one state behind cylinder counter 204 by hardwiring a value "1" to be subtracted from the output of cylinder counter 204. Alternatively, the value applied to subtractor 205' may be modified by action of the CPU 201 via a connection therebetween through a memory device such as the memory 220 (see the optional connection illustrated as electrical connection 219 in FIGS. 2A and 2B). The CPU 201 may set the subtractor value to "0" so that elements 204 and 205' are in phase, or to "1" so that they are ninety engine degrees out of phase. In this manner, even transient quasi-overlap conditions can be accommodated, for example, when the quasi-overlap occurs due to a particular engine RPM at a given moment.

A "true overlap" condition exists when one cylinder has fuel injected into it (state N) before another cylinder has its fuel injection interval terminated (state N-1). A true overlap condition is accommodated by providing a trigger or reset to elapsed timer 211 directly from cylinder counter 205 rather than from position counter 210, as shown by the arrow 212B, illustrated in phantom to identify this alternate configuration. As a result of this alternate configuration, the fuel injection interval is terminated with reference to an interval starting at the time that a change of state has been monitored (by cylinder counter 205) and ending after an interval defined by the injection duration data 203 for the present state of the system. It should be understood that only one of connections 212A and 212B would be present in a particular implementation. Also, cylinder counter 205 would be configured to lag cylinder counter 204 by one cylinder, so that the cylinder counters cycle, for example, as follows: 0,1,2, 3,0,1 . . . for cylinder counter 204 and 1,2,3,0,1,2 . . . for cylinder counter 205.

Figure 3:
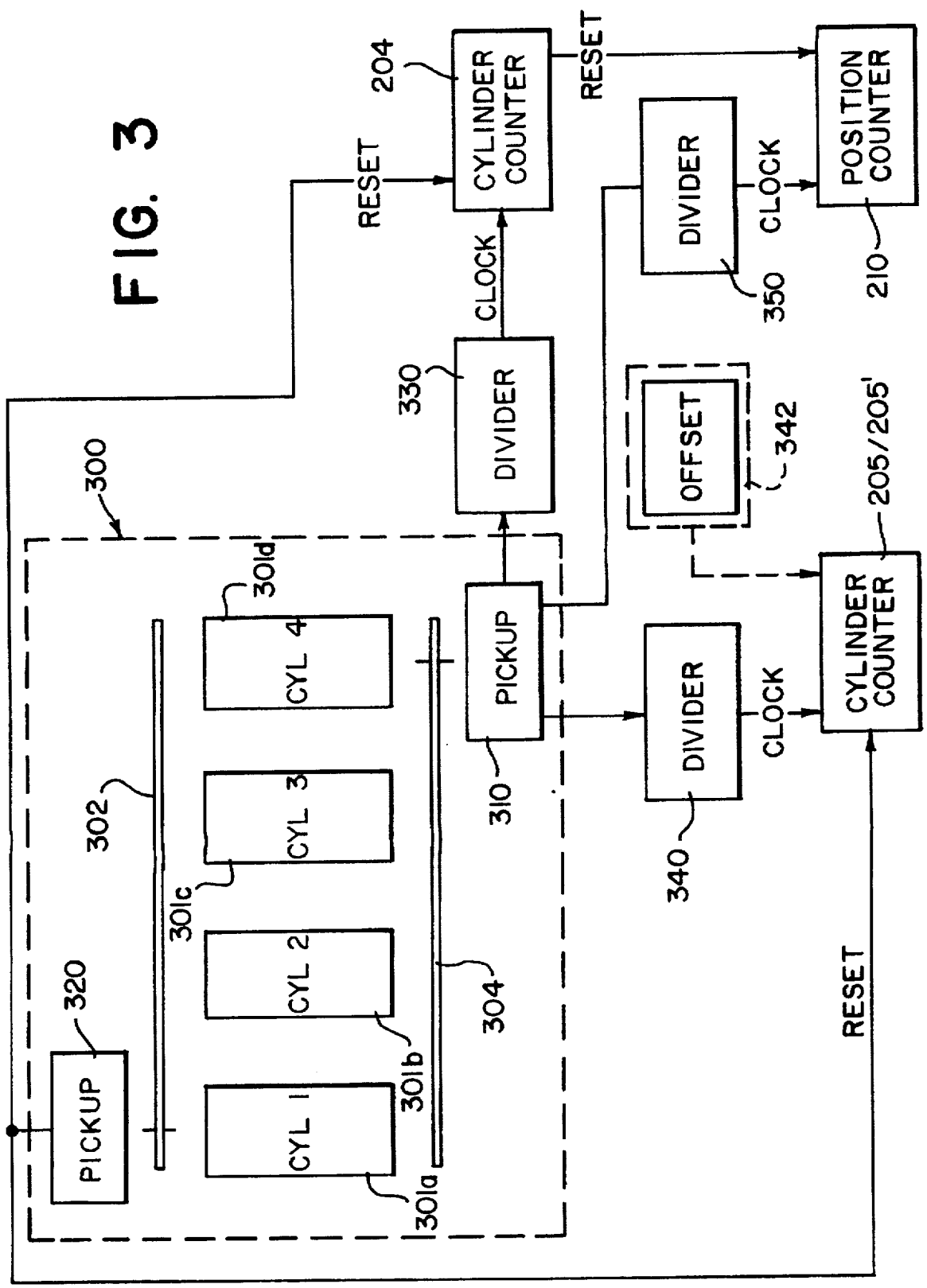
FIG. 3 is a block diagram of the mechanism for deriving timing signals of the present invention.

With reference now to FIG. 3 the engine synchronization portion of the exemplary application of the present invention is described. The engine 300 is shown diagrammatically, and in relevant part, to include the cylinders 301, a camshaft 302, and a crankshaft 304. The camshaft and crankshaft 302, 304 are operatively coupled to the cylinders 301, as is well known in the art. The clock signal applied to the counters 204, 205 is preferably derived from the engine 300 using a signal from a variable-reluctance, optical, or Hall-effect crankshaft pickup device 310 which is linked to the crankshaft 304. The signal from the pickup device 310 is applied to the cylinder counters 204, 205 directly or, for example, through frequency dividers 330 and 340. The specific pulse rate of the clock input is preferably that which will increment a two-bit binary output counter every 90 engine degrees (180 crankshaft degrees). If the output of the crankshaft pickup device 310 is to be applied directly into cylinder counters 204, 205, then they should be configured in a divide-by-R mode, where R is the resolution of the pickup device 310. For example, if the pickup device 310 has a resolution of ten engine degrees, then the cylinder counters 204, 205 should divide by eighteen to increment the counter every 180 crankshaft degrees. Alternatively, when a frequency divider is used, the resolution R can be programmed into the device or hardwired so that the cylinder counters 204, 205 operate as above. Thus, according to this preferred construction in a four cylinder engine, each of the cylinder counters 204, 205 can represent one of four states at any given time, and perhaps different states, for example, states N and N-1.

The cylinder counter 204 is synchronized to the engine by applying a reset signal to the cylinder counter 204 during the fuel injection period of a preselected cylinder, for example, cylinder 1. The reset signal is preferably derived directly from a camshaft pickup device 320 which is linked to the camshaft 302. The cylinder counter 204 is then provided clock pulses as derived from a signal from the pickup device 310 at the crankshaft slightly before the earliest possible time of fuel injection in each engine cycle. The cylinder counter 205 is synchronized to the engine 300 in a similar fashion as the cylinder counter 204, using a reset signal derived from the camshaft pickup device 320 and a clock signal derived directly from the crankshaft pickup device 310. If it is desired not to have the cylinder counter 205 in phase with cylinder counter 204, then a subtractor 205' can receive the same signal as the cylinder counter 204, yet have an offset applied from an offset memory cell 342 so that the count at the state signal output of element 205' leads or lags the state signal output of cylinder counter 204. While the camshaft pickup device 320 may provide less accuracy and resolution than the crankshaft pickup device 310, the camshaft pickup device 320 advantageously provides a signal only once per engine cycle (two crankshaft revolutions), and, therefore, may readily be used for controlling the cylinder counters 204, 205 in this exemplary application.

With each clock pulse derived from the crankshaft pickup device 310 of the engine 300, the cylinder counters 204, 205 generate a state signal representing the sequence 00'B (0 decimal), 01'B (1 decimal), 10'B (2 decimal), 11'B (3 decimal), 00'B, 01'B, . . . in synchronization with the changes of engine state, where the digits represent a two bit binary number and the letter identifies the cylinder. These cyclical signals are used to access the address in memory of the data to be supplied to the shared hardware resource, and to select the shared hardware resource based on the state of the engine.

The position counter 210, which is preferably a high-resolution programmable counter and may be implemented using multiple counters, such as the commercially available 74LS161, also receives clock pulses derived from signals from the crankshaft pickup device 310, either directly or through a frequency divider 350, similar to frequency dividers 330 and 340, to monitor the engine's current angular position. The position counter 210 is configured to monitor engine position with greater precision than cylinder counters 204, 205. For example, while the cylinder counters 204, 205 increment every 180 crankshaft degrees, the position counter may increment in 90 crankshaft degree intervals. The position counter 210 is reset with each change of state of cylinder counter 204.

In sum, the disclosed system utilizes a hardware-based state monitor for dynamically directing signals to and from shared hardware resources. The operating parameters or signals required by a shared hardware resource are initially established and may be periodically refreshed by a CPU. These signals are stored in memory cells and can be updated for future use by the shared hardware resource either by modifying the data in particular memory cells, or by changing the location in memory to be accessed, as by modifying a pointer to the memory cells. The operating parameters, including some or all of the external connections of the shared hardware resource, are dynamically modified or changed in response to known or anticipated changes in the state of the system under control, for example, the rotation of the engine crankshaft.

Thus, a hardware system for controlling signal flow into and out of a shared hardware resource that reduces some hardware requirements in physical systems by providing for dynamic allocation of data, as well as dynamic electrical or mechanical connections to other physical elements, has been shown and described in a system that is instigated by means other than a central processor.

The foregoing system is "fault tolerant" because the system will, in the exemplary embodiment, use whatever position and injection duration data is stored in the parameter memory 220 (at locations 202, 203) at the time that a change of engine state is detected, regardless of whether the data in those locations has been updated in view of engine speed or other dynamic factors. For example, a sudden acceleration caused, for example, by depressing the accelerator, will rapidly increase the number of revolutions per minute of the engine and concomitantly reduce the injection duration period (due to faster piston motion). Thus, while one portion of the system under control (e. g., the LAN) may be aware of the engine speed, the fuel injection system will use whatever data is presently available without polling the CPU 201 for such updated data and without waiting for a semaphore-like confirmation from the CPU 201 that the presently stored data is still valid. After a short interval, the CPU 201 will update the parameter memory 220 so that the updated data at locations 202, 203 will be available to the fuel injection system the next time that a change of state is monitored.

Thus, in a fuel injection system, the monitored state changes upon detection of the intake (induction) stroke. In other control systems, the compression, power, or exhaust strokes for a given cylinder may trigger the detection of a change of state. For example, in an engine spark plug control system, the start of the combustion stroke triggers a change in state. Upon detection of the combustion stroke, the spark ceases. The time at which the spark commences occurs at a fixed time prior to cessation, which time is known and applied based on the previous engine rotation, as understood by those skilled in the art. Also, the engine valves may be controlled in a system according to the invention by detecting a change of state at the start of the intake stroke for the intake valve and the start of the exhaust stroke for the exhaust valve. These states change at the beginning of the compression stroke and the beginning of the intake stroke for the intake and exhaust valves, respectively. The clock and reset pulses for each of these systems is achieved by suitably decoding the output of the crankshaft and camshaft pickup devices 310, 320 with regard to the engine angular position in which these respective control systems change states.

While the timing signals have been described in connection with the sharing of hardware resources associated with a fuel injection system, these signals may readily be employed to share other hardware resources not specifically described herein.

Apart from the foregoing exemplary application, the invention may have utility in other engine designs, as well as in applications unrelated to engines. In particular, cyclic systems and systems that change from one state to another in a known manner can share hardware resources in accordance with the invention by monitoring the present state and providing timing circuitry for dynamically selecting the appropriate inputs, outputs, or both, for a shared hardware resource.

While the present invention has been particularly shown and described with reference to preferred embodiments thereof, it will be understood by those skilled in the art that various changes in form and details may be made therein without departing from the spirit and scope of the invention.

What is claimed is:

1. A method for sharing a hardware resource in a multi-state system comprising the steps of:

monitoring changes in state in the multistate system using a pickup device;

accessing a memory containing control parameters required by the hardware resource in response to a state signal from the pickup device;

applying a control signal that is related to the accessed control parameters to the hardware resource; and connecting the hardware resource to a selected one of several output devices, the output device being selected in relation to the state signal.

2. The method as in claim 1, further comprising the step of applying a different one of the accessed control parameters to the hardware resource in response to a second signal.

3. A method for sharing a hardware resource in a system for an engine operation, comprising the steps of:

monitoring changes in state in the cylinder of the engine using a pickup device;

accessing a memory containing control parameters required by the hardware resource in response to a state signal from the pickup device;

applying one of a start and a duration signal to the hardware resource, the start and duration signals being related to the accessed control parameters; and connecting the hardware resource to a selected one of several output devices, each of said output devices being associated with a particular cylinder of the engine and being selected in relation to the state signal.

4. The method as in claim 3, wherein the engine operation is at least one of fuel injection, spark plug control, or valve control.

5. The method as in claim 3, further comprising the step of accessing or updating the memory containing control parameters using a microprocessor.

6. The method as in claim 3, wherein the control parameters are related to engine cylinder positions and are calculated by a microprocessor.

7. The method as in claim 5, wherein the pickup device is a crankshaft pickup device and the state signal is related to a position of the crankshaft.

8. The method as in claim 6, wherein the shared hardware resource is a position counter.

9. The method as in claim 3, wherein the control parameters are calculated by a microprocessor.

10. The method as in claim 9, wherein the pickup device is a crankshaft pickup device and the state signal is related to a position of a crankshaft.

11. The method as in claim 10, wherein the shared hardware resource is an elapsed timer.

12. The method as in claim 10, wherein the accessing and connecting steps are based on the state signal from the pickup device with respect to the position of the crankshaft at different times.

13. A method for sharing hardware resources in a system for an engine operation, comprising the steps of:

monitoring changes in state in the engine using a pickup device;

accessing a memory containing control parameters required by a first hardware resource in response to a state signal from the pickup device;

applying a start signal to said first hardware resource, the start signal being related to the accessed control parameters;

connecting said first hardware resource to a selected one of several output devices, each of said output devices being selected in relation to the state signal;

accessing a memory containing control parameters required by a second hardware resource in response to the state signal from the pickup device;

applying a duration signal to said second hardware resource, the duration signal being related to the accessed control parameters; and connecting said second hardware resource to one of said several output devices, the one of said several output devices being selected in relation to the state signal.

14. The method as in claim 13, wherein said second hardware resource is connected to said selected one of said several output devices.

15. The method as in claim 13, further comprising the step of accessing or updating the memory containing control parameters using a microprocessor.

16. The method as in claim 13, wherein the control parameters are related to engine positions calculated by a microprocessor.

17. The method as in claim 13, wherein the pickup device is a crankshaft pickup device and the state signal is related to position of the crankshaft.

18. The method as in claim 17, wherein the accessing and connecting steps are based on the state signal from the crankshaft pickup device with respect to the position of the crankshaft at different times.

19. The method as in claim 13, wherein said first shared resource is a position counter.

20. The method as in claim 13, wherein the control parameter stored at the second one of the predetermined memory addresses is related to fuel injection durations calculated by a microprocessor.

21. The method as in claim 13, wherein said second shared resources is an elapsed timer.

22. A system for sharing a hardware resource, comprising:

a memory for storing control parameters;

a microprocessor in communication with the memory for updating the control parameters;

a pickup device for generating a state signal corresponding to the state of the system;

selection means responsive to the state signal for selecting one of the control parameters from the memory;

means for applying a control signal related to the selected control parameter to the shared hardware resource; and a switch in communication with the shared hardware resource and selectively in communication with one of a plurality of output devices, the one of the plurality of output devices being selected in relation to the state signal.

23. The system as in claim 22, wherein the system is an engine, and wherein each of the plurality of output devices are fuel injection output drivers and are adapted to drive a fuel injector.

24. The system as in claim 22, wherein said pickup device is a crankshaft pickup device which is in communication with a crankshaft of the engine.

25. The system as in claim 22, wherein said shared hardware resource is one of a position counter and an elapsed timer.

26. A system for sharing a hardware resource, comprising:

a memory having control parameters stored therein;

a microprocessor in communication with said memory;

a pickup device connected to the system, said pickup device generating a state signal corresponding to a state of the system;

a data selector responsive to the state signal, said data selector connecting one of the control parameters from the memory to the shared hardware resource; and a switch responsive to the state signal to connect one of a plurality of output devices to the shared hardware resource.

27. The system as in claim 26, wherein the system is an engine, and wherein each of the plurality of output devices are fuel injection output drivers and are adapted to drive a fuel injector.

28. The system as in claim 26, wherein said pickup device is a crankshaft pickup device which is in communication with a crankshaft of the engine.

29. The system as in claim 26, wherein said shared hardware resource is one of a position counter and an elapsed timer.

30. A system having N states for sharing at least two hardware resources, comprising:

a memory having control parameters stored therein;

a microprocessor in communication with said memory;

a pickup device connected to the system, said pickup device generating state signals, each of said state signals corresponding to different one of the N system states;

a first data selector responsive to one of said state signals, said data selector connecting one of the control parameters from said memory to a first shared hardware resource;

a first switch responsive to one of said state signals to connect one of a plurality of output devices to the first shared hardware resource;

a second data selector responsive to another of said state signals, said data selector connecting another of the control parameters from said memory to a second shared hardware resource; and a second switch responsive to another of said state signals to connect another of the plurality of output devices to the second shared hardware resource.

31. The system as in claim 30, wherein the system is an engine, and wherein each of the plurality of output devices are fuel injection output drivers and are adapted to drive a fuel injector.

32. The system as in claim 30, wherein said pickup device is a crankshaft pickup device which is in communication with a crankshaft of the engine.

33. The system as in claim 30, wherein said first shared hardware resource is a position counter and said second shared hardware resource is an elapsed timer.

* * * * *